United States Patent [19]

Daniels

[11] Patent Number: 4,756,325

[45] Date of Patent: Jul. 12, 1988

[54] COLLAPSIBLE CANOPY FOR PICK-UP TRUCKS

[76] Inventor: Duane D. Daniels, HC 64, Box 25, Ainsworth, Nebr. 69210

[21] Appl. No.: 793,989

[22] Filed: Nov. 1, 1985

[51] Int. Cl.$^4$ .................... E04H 15/06; E04H 15/38; B62D 25/06; B60R 15/00

[52] U.S. Cl. ..................................... 135/88; 135/103; 296/105; 296/165

[58] Field of Search ...................... 296/100, 105, 165; 135/87, 88, 89, 903, DIG. 8, DIG. 9, 102, 106, 108, 103

[56] References Cited

U.S. PATENT DOCUMENTS

| | | | |
|---|---|---|---|
| 2,068,041 | 1/1937 | Tate, Sr. | 296/105 |
| 2,107,608 | 2/1938 | Hewlett | 135/88 |
| 2,319,292 | 5/1943 | Boggs | 135/119 X |
| 2,344,551 | 3/1944 | Heinrich | 296/100 |
| 2,389,298 | 11/1945 | Ellis | 135/119 X |
| 3,201,171 | 8/1965 | Wickard | 296/105 |
| 3,231,305 | 1/1966 | Beckman | 135/88 X |
| 3,310,338 | 3/1967 | Greenberg | 296/105 |
| 3,363,938 | 1/1968 | Schultz | 296/105 |
| 3,447,830 | 6/1969 | Willison | 296/100 |
| 3,503,566 | 3/1970 | Travis | 135/89 X |
| 3,688,787 | 9/1962 | Feather | 135/88 X |
| 3,901,548 | 8/1975 | Seaman, Jr. | 135/102 X |
| 4,285,539 | 8/1981 | Cole | 296/105 |
| 4,289,346 | 9/1981 | Bourgeois | 296/105 |
| 4,659,136 | 4/1987 | Martin et al. | 296/165 X |

FOREIGN PATENT DOCUMENTS

| | | | |
|---|---|---|---|
| 300361 | 7/1928 | United Kingdom | 296/105 |
| 637871 | 5/1950 | United Kingdom | 296/105 |

Primary Examiner—Robert A. Hafer
Assistant Examiner—D. Neal Muir
Attorney, Agent, or Firm—Zarley, McKee, Thomte, Voorhees & Sease

[57] ABSTRACT

A collapsible canopy for the cargo bay of pick-up trucks, including transversely extending ribs which are longitudinally slidable along tracks on the sides of the cargo bay. Rack and pinion assemblies attached to the legs of the rearward rib, and integrally tied to a rack attached to each track, maintain transverse perpendicular alignment of the legs of that rib. Shafts projecting from the pinions and mounted to the legs of the rear rib are connected by an overhead axle with universal shafts at each end such that longitudinal movement of one leg of the rear rib will rotate its pinion, which is transmitted via the overhead axle to the opposite pinion and will thereby simultaneously move the other leg.

8 Claims, 3 Drawing Sheets

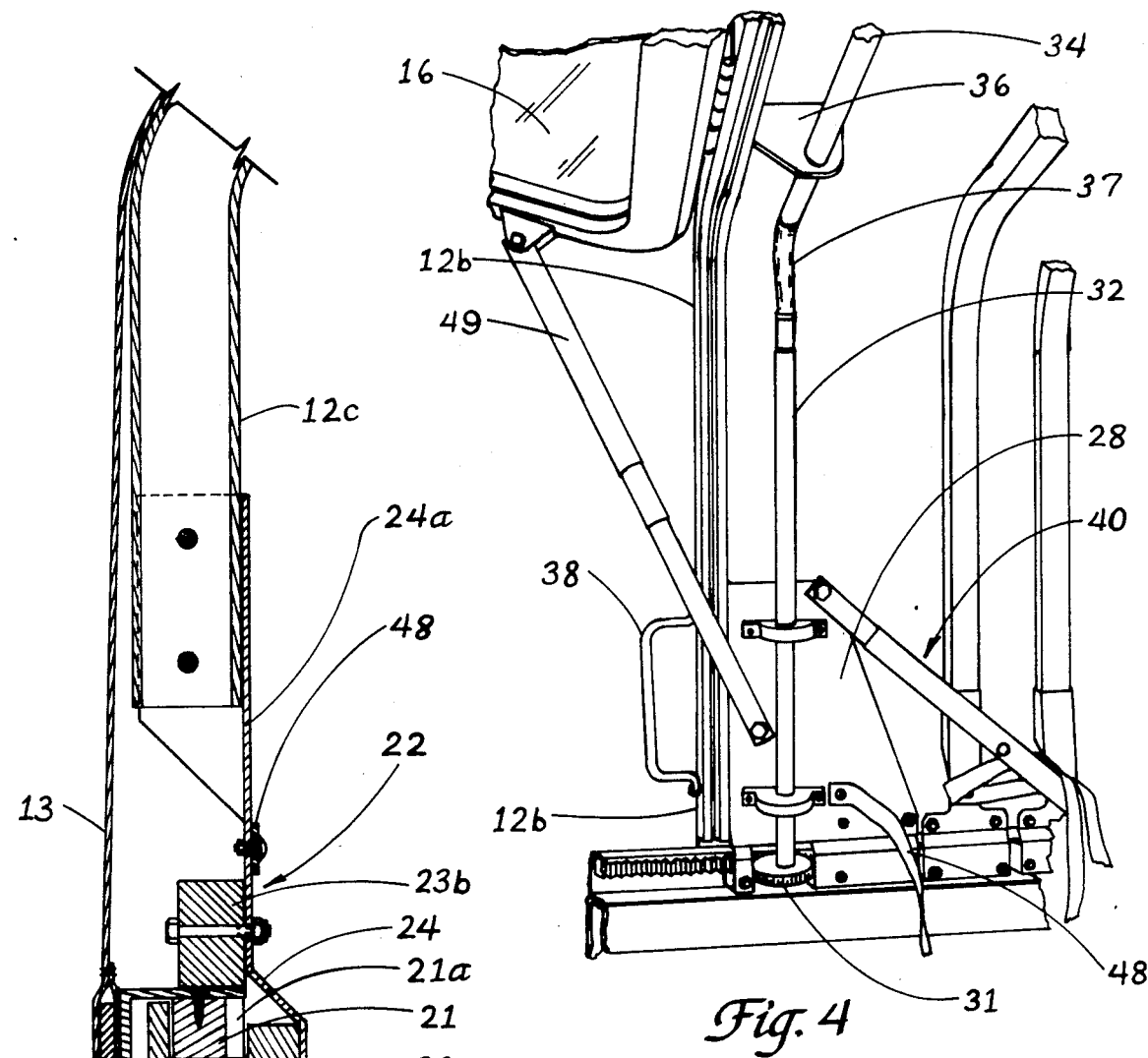
Fig. 3
Fig. 4
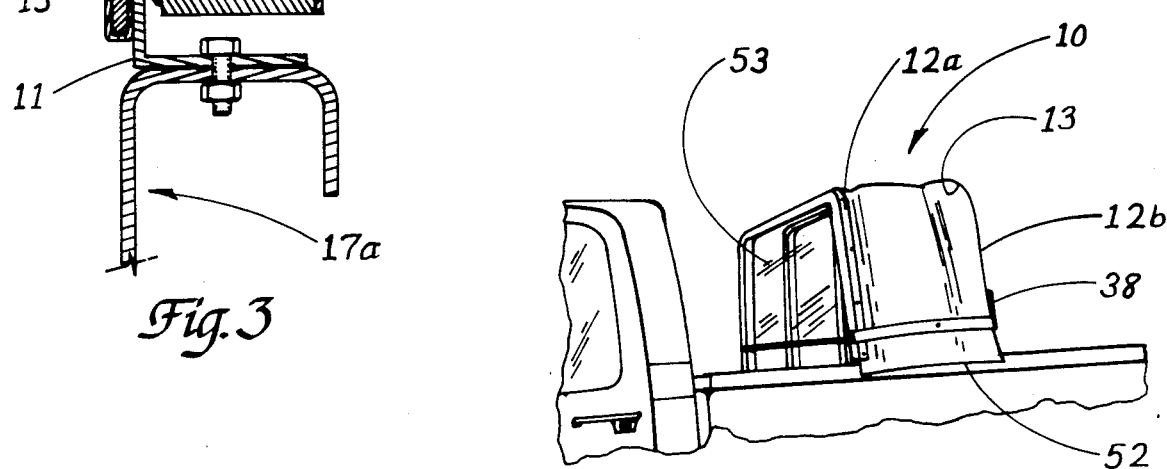
Fig. 5

COLLAPSIBLE CANOPY FOR PICK-UP TRUCKS

TECHNICAL FIELD

The present invention relates generally to collapsible canopies for pick-up trucks and more particularly to such a canopy which is easily operated by one person.

BACKGROUND ART

Collapsible canopies for pick-up trucks typically utilize a series of ribs which transverse the cargo bay and slide along tracks mounted to the sides of the truck. A flexible cover of canvas or the like is connected to each rib, and will drape between the ribs as the canopy is longitudinally collapsed.

Although such canopies have made it simpler and easier to load and unload the truck's cargo bay, they still suffer several deficiencies. Unless a person is stationed along each side of the canopy to simultaneously pull the ribs along the track, each rib will tend to find in the track as one leg or the other lags behind and deviatres from tis perpendicular orientation to its track. Due to the lower silhouette of such canopies or because the truck may be loaded it is not feasible to rely on moving the ribs from inside the truck by pushing or pulling on their center portions.

U.S. Pat. No. 3,688,787 to C. Feather, discloses a cable and pulley system which is designed to solve this problem. As such it represents an advance in the art. In Feather, single pulleys are mounted at each rear corner of the pick-up's cargo bay and double-grooved pulleys are mounted at the front corners. The rear rib is affixed to an endless cable which loops about the pulleys. The deficiencies of pulleys and cables located adjacent to a cargo are well known. Cables eventually stretch, both cables and pulleys are in frictional contact and, if exposed, they are easily fouled and will readily collect dirt and grime.

In addition, as disclosed in the specificaiton, the Feather canopy is not operably removable from the truck. To make it operably remov̧able, either the cable system has to be left on the truck or removed along with a rigid "U"-shaped frame of some sort, a task not easily accomplished by one person. Also, the draping of material between the ribs of the canopy, when collapsing the structure, not only reduces the extent to which the canopy can be collapsed, but also blocks the view of the driver through the rear view mirror.

DISCLOSURE OF THE INVENTION

It is therefore an object of the present invention to provide an improved collapsible canopy for the cargo bay of a pick-up truck.

Another object is to provide a collapsible canopy which may be easily expanded and collapsed by one person.

A further object of the invention is to provide a collapsible canopy with few moving parts and which is economically manufactured.

Yet another object is to provide a collapsible canopy which will not obstruct the view from the cab of the truck when the canopy is in its collapsed state.

Still another object of the present invention is to provide a collapsible canopy which can be easily and quickly installed on and removed from the truck.

Yet a further object is to provide a collapsible canopy which will collapse to a compact state and maintain an aesthetic appearance in the collapsed orientation.

More generally it is an object of the present invention to provide a collapsible canopy utilizing parallel arched ribs which extend transversely across the cargo bay of a pick-up truck. The ribs are longitudinally slidable in tracks mounted to the sides of the cargo bay. Each leg of the rearward rib of the canopy is mounted to the side of each track through a rack and pinion assembly. Each pinion depends from a rotatable shaft journaled to each leg of the rear rib. An axle having universal shafts at each end connects the two pinion shafts to transmit the rotational movement of the one pinion to the opposing pinion. Each rack is mounted on one of the two tracks. The legs of the ribs on each side of the cargo bay are connected via straps, such that movement of the rear rib of the canopy towards the rear of the cargo bay will pull each intermediate rib simultaneously as the canopy is extended. Also, the cover can be folded atop the ribs so as not to block the driver's rearward view.

These and other objects, advantages and novel features of the present invention will become apparent from the following detailed description of the invention when considered in conjunction with the accompanying drawings.

BRIEF DESCRIPTION OF THE DRAWINGS

FIG. 3 is an enlarged partial sectional view of the device taken along line 3—3 in FIG. 2.

FIG. 4 is a partial perspective view of the device showing the rack and pinion assembly.

FIG. 5 is a slightly reduced perspective view of the device in its collapsed condition as installed on a pick-up.

BEST MODE FOR CARRYING OUT THE INVENTION

Figure 1:
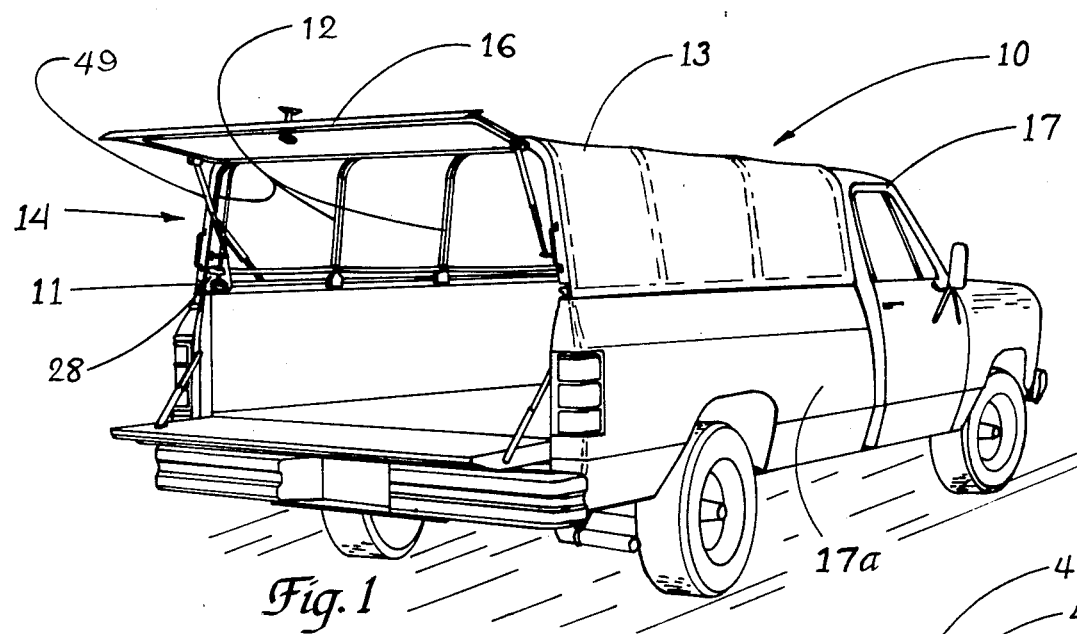
FIG. 1 is a perspective view of the device in its expanded condition mounted on the cargo bay of a pick-up truck.

Referring now to the drawings in which identical or corresponding parts are indicated by the same reference character throughout the several views, and more particularly to FIG. 1, whereon the present invention is designated generally at 10 and is shown mounted on the cargo bay 17a of a pick-up truck 17. Canopy 10 includes longitudinal tracks 11, transverse ribs 12, cover 13, rack and pinion assembly designated generally at 14, and tiltable rear window 16.

Referring to FIG. 3, channel-shaped track 11 is mounted to the upper edge of each side of cargo bay 17a, with the open portion of the channel directed towards the inside of cargo bay 17a. Track 11 runs the length of each side of cargo bay 17a (see FIG. 2) and has a closed end 11a to stop ribs 12 from becoming detached from the track at the forward end. The rearward end 11b of track 11 is open to allow removal of ribs 12, as described hereinbelow.

Figure 2:
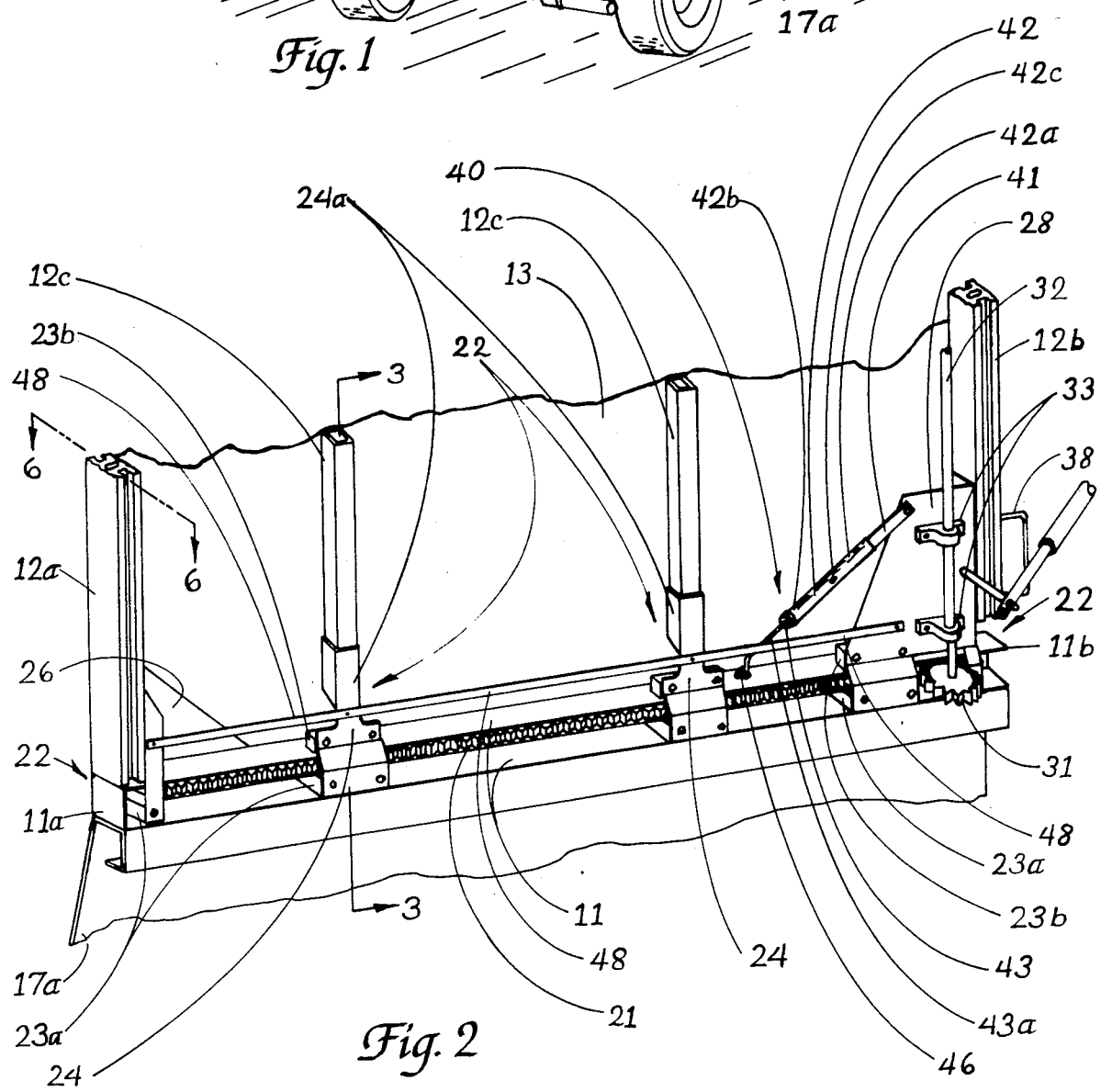
FIG. 2 is a partial perspective view from inside the cargo bay of the device in its expanded state.

Still referring to FIG. 3, rack 21 (of rack and pinion assembly 14, shown in FIG. 1) is affixed to the lower face of the upper leg of each channel 11, with the teeth 21a thereof positioned to face the interior of cargo bay 17a (see also, FIG. 2). Each rib 12, generally in the shape of an inverted "U", extends transversely across cargo bay 17a and is connected to track 11 via a glide assembly, designated generally at 22.

Each glide assembly 22 includes a lower and upper glide 23a and 23b, respectively, mounted to a bracket 24. Lower glide 23a has a channel in its upper face so that it will slide longitudinally along rack 21. Upper glide 23b is fastened slightly above the upper leg of channel 11 and will slide along the upper face thereof. Thus, it can be seen that glide assembly 22 will slide along track 11, and can only be removed by sliding it off its rearward end 11b.

Referring now to FIG. 2, the upper end of bracket 24, is formed into an outwardly facing channel 24a for receiving an end of a rib 12, which is bolted thereto. Thus, ribs 12 will slide along tracks 11, and will be held generally upright via glides 23a and 23b in close tolerance with tracks 11.

Figure 6:
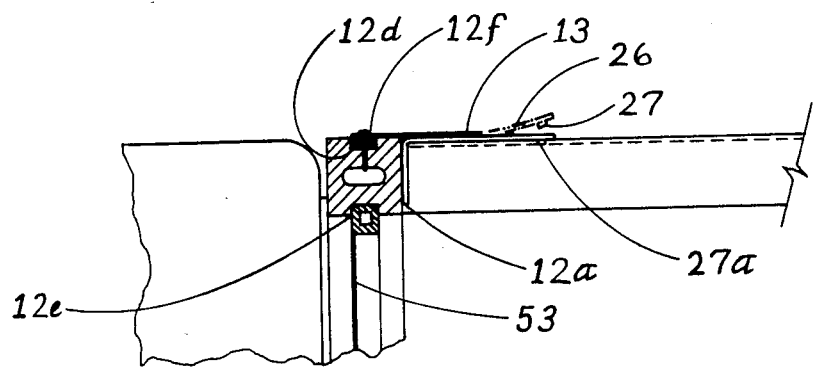
FIG. 6 is a slightly enlarged partial sectional view of the device looking downward through a horizontal plane and taken along line 6—6 in FIG. 2.

Cover 13 is fastened at each end to a front rib 12a and a rear rib 12b, respectively. They are each of a slightly different cross section than intermediate ribs 12c, in order to accommodate cover 13. As shown in FIG. 6, front rib 12a has a wide exterior-facing channel 12d along one longitudinal face and a narrower interior-facing channel 12e along the opposing longitudinal face. Interior channel 12e holds front transparent panel 53 (see also FIG. 5). Exterior-facing channel 12d has a mating strip 12f which is fastened in place after the front edge of cover 13 is placed into exterior channel 12e. Rear rib 12b has an exterior slot and mating strip which serve the same purpose with respect to the rear end of cover 13. Thus, rear rib 12b will pull cover 13 taut as it is moved rearwardly. In order to keep the longitudinal edges of cover 13 from flapping loosely in the wind, magnets 15 (see FIG. 3) are sewn along the edges. Obviously, if neither track 11 or the sides of cargo bay 17 are of a magentically-attractive material, snaps or other fastening means could be substituted for the magnets.

As can be seen in FIG. 2, front rib 12a is mounted on track 11 in a manner similar to that of intermediate ribs 12c. Also affixed to front rib 12a is triangular plate 26. As better seen in FIG. 6, plate 26 serves to lock rib 12a on to track 11 when canopy 10 is installed on pick-up truck 17. A free leg of plate 26 is positioned parallel and adjacent to the vertical side of track 11. Plate 26 has a short, horizontally-projecting peg 27, which fits into a corresponding aperture 27a in the vertical side of track 11. Aperture 27a is located so as to lock front rib 12a into its desired installed position. By pulling plate 26 away from track 11 near peg 27, plate 26 will bend slightly, thus releasing peg 27 from aperture 27a. This, in turn, allows front rib 12a to be removed rearwardly from track 11 through its rear end 11b.

Rear rib 12b is also mounted on track 11 in a manner similar to that of intermediate ribs 12c. However, trapezoidal plate 28 is mounted to rear rib 12b so as to project forwardly in a vertical plane and serves to mount rear rib 12b onto track 11 via two sets of lower and upper glides 23a and 23b. Since canopy 10 will be expanded and collapsed by applying force to rear rib 12b, the extra set of glides serve to maintain the vertical orientation of rear rib 12b.

Referring now to FIG. 4, rack and pinion assembly 14 includes the two racks 21, two shafts 32 each centered vertically between the two sets of glides on rear rib 12b and journaled to the interior face of trapezoidal plate 28 via two bearings 33, a pinion gear 31 attached axially on the lower end of each of the vertical shafts 32, two flexible hoses 37, and an axle 34. Axle 34 is rotatably mounted in bearings 36 which depend and project forwardly from the horizontal portion of rib 12b. Each flexible hose 37 is affixed at one end to the upper end of the shaft 32 and at the other end to an end of axle 34 to form two universal joints between shafts 32 and axle 34. Other forms of creating a universal shaft, such as beveled gears, worm gears, and double "U" joints are known in the art. However, the inventor has found flexible hose strong enough for the application disclosed herein. Also, a hose is not as likely to catch on the adjacent fabric of cover 13.

It can be seen that as one end of rib 12b is moved along track 11, its associatd pinion gear 31 will be caused to rotate by the corresponding rack 21. This rotation is translated along the associated shaft 32 to axle 34 via the associated flexible hose 37, and then to the other pinion gear 31 on the opposite end of rear 12b, thereby moving that opposite end an equal distance in the same direction. Since both legs of rib 12b will move simultaneously equal distances, one leg will not lag behind the other. The tendency of rib 12b to bind in tracks 11 is sufficiently reduced by this arrangement to allow a lone person to expand and collapse canopy 10 by moving either leg of rear rib 12b. A handle 38 is mounted on each leg of rear rib 12b to aid in moving it along track 11.

Referring again to FIGS. 2 and 3, a strap 48 is fastened near the upper side of track 11 to the interior side of the brackets supporting each leg of ribs 12. Straps 48 are of such length and ribs 12 are fastened at such positions therealong that when straps 48 are fully extended ribs 12a, 12b and each rib 12c will be located in their desired positions when canopy 10 is in its installed expanded state. Thus, as rear rib 12b is pulled rearwardly from the "collapsed" orientation, first the rearward-most intermediate rib 12c and then the next intermediate rib 12c will be pulled into th desired position. The effect of rack and pinion assembly 14 will be transferred to each rib 12c by straps 48. Later, as canopy 10 is collapsed, rear rib 12b will be moved forward along tracks 11, rack and pinion assemblies 14 keeping the legs from binding. Rear rib 12b will then contact the adjacent intermediate rib 12c, then the next, and finally stop when front rib 12a is contacted and canopy 10 is completely collapsed. In such manner, one person can easily expand and collapse canopy 10.

Figure 7:
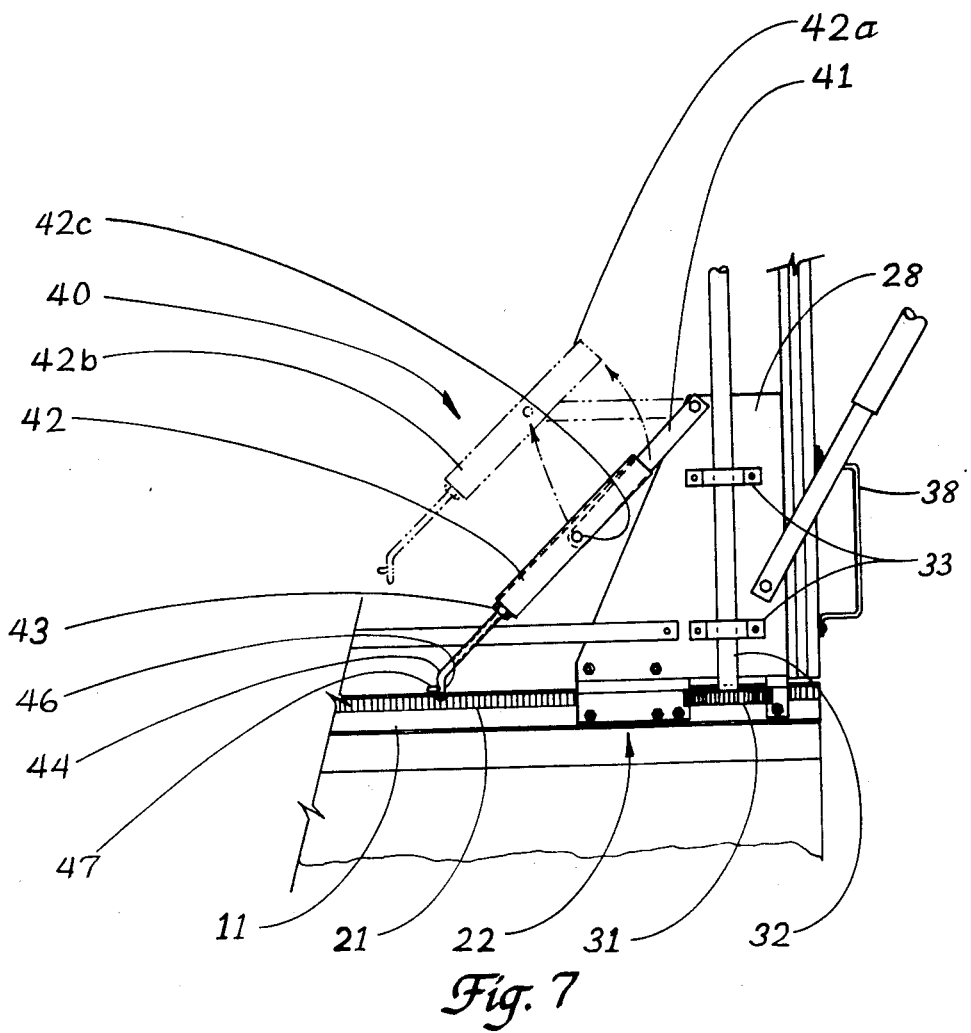
FIG. 7 is a slightly enlarged partial elevational view showing the locking assembly.

Referring now to FIG. 7, rear rib 12b is shown in solid lines as having been locked in place. This is accomplished by pulling cover 13 taut over intermediate ribs 12c, and employing a locking assembly designated generally at 40. Locking assembly 40 includes an arm 41 pivotally connected at one end to an upper forward point on plate 18, and pivotally connected at the other end to a point 42c near the center of channel-shaped arm 42. The upper end 42a of arm 42 slides over arm 41 when pivoted to a position coaxial therewith. The broken-lines in FIG. 7 show the positions of arms 41 and 42 prior to being "locked" into their coaxial solid-line position. Affixed to the lower end 42b of arm 42 is a threaded nut 43. A correspondingly threaded rod 44 projects therefrom axially to arm 42. Thus, rod 44 becomes an extension of arm 42, and will allow the total length of both to be adjusted by rotating rod 44 within nut 43. The free end of rod 44 is bent to be generally vertical when arm 42 is axial with arm 41, and may be removably inserted within an aperture 46 in the top of track 11. A small pin 47 affixed to the side of the bent end of rod 44 keeps rod 44 from sliding too far into aperture 46. Thus, locking assembly 40 will keep plate 28 and rib 12b from sliding forward along track 11 when rod 44 is inserted into aperture 46 and arm 42 is pivoted into a position somewhat coaxial with arm 41. The location of pivot point 42c is such that arms 41 and 42 will go slightly beyond a coaxial position, thereby "locking" them in place in a well-known manner.

Referring now to FIGS. 1 and 4, overhead tiltable rear window 16 is hingedly mounted to the upper horizontal portion of rear rib 12b. Pivotal, extendable arms 49 connect window 16 to plate 28 on each side of rib 12b, to allow window 16 to be pivoted upwards and locked in place. Window 16 will be aligned with the end gate of pick-up cargo bay 17a, to form a rear wall, when in its vertical position.

Referring now to FIG. 5, once rear rib 12b is pushed forward as far as possible, canopy 10 may be held in its collapsed state by looping a belt 52 about handle 38 and fastening the free end thereof to front rib 12a. Since cover 13 is not tied to any of the intermediate ribs 12c, it can be folded upon itself several times. No portion of it will hang down between ribs 12 and thereby block the view through transparent front panel 53 and rear window 16. This arrangement is made possible by the novel use of straps 48 as described hereinabove.

Once canopy 10 has been thus collapsed, it can be removed from tracks 11 by first unlocking front rib 12a as described hereinabove, and then sliding it rearwardly along tracks 11 and off their rearward ends 11b. Channels 11 with racks 21 will remain affixed to the upper edges of the sides of cargo bay 17a. Thus, no moving parts or easily damaged parts are left on cargo bay 17a.

It will be readily understood that the particular disposition or arrangement or nature of the elements of the invention are not of the essence of the invention, and that many variations, substitutions, and modifications may be made, in departure from their particular construction and characterization in the drawings and foregoing description, without departing from the true spirit of the invention. It is therefore to be understood that the invention should be limited only by the breadth and scope of the appended claims.

What is claimed is:

1. A collapsible canopy in combination with a pick-up truck, the truck being of the type having a cab and cargo bay, the cargo bay bounded by a pair of spaced-apart panels, the cab and an end gate, comprising:
    a track removably mounted on an upper edge of each side panel of the cargo bay;
    a flexible sheet-material cover for selectively, covering said cargo bay;
    a firt rib, for supporting one edge of said cover, having a leg slidably mounted on each said tracks, and having means for maintaining said rib in a vertical plane;
    a second rib, for supporting an opposing edge of said cover, having a leg mounted on the upper edge of each side panel of the cargo bay, said second rib being mounted in a vertical plane forward of said first rib, said vertical plane being toward said cab;
    two rack and pinion means, the rack elements thereof each facing the cargo bay and affixed in meshing engagement with said tracks, each pinion element thereof having a vertical shaft axially affixed to its upper side, and each said shaft being rotatably mounted to a leg of said first rib; and
    universal shaft means for connecting each end of an axle to an adjacent free end of said pinion gear shafts, said universal shaft means being a resilient flexible hose, whereby movement of one leg of said first rib results in rotation of one pinion along its rack which will simultaneously transfer rotation through said axle to the other vertical shaft and to the attached other pinion and maintain said first rib in transverse perpendicular alignment while the canopy is collapsed or expanded by moving said one leg of said first rib.

2. The collapsible canopy for pick-up trucks of claim 1, further comprising means for maintaining the longitudinal position of said first rib away from said second rib.

3. The collapsible canopy for pick-up trucks of claim 1, wherein the legs of said second rib are slidably mounted to said tracks and further comprising means for operably securing said second rib at a position forward of said first rib.

4. The collapsible canopy for pickup trucks of claim 3, wherein said tracks have forward and rearward ends and have a stop at the forward ends thereof, whereby said first and second ribs may be removed from the rearward ends of said tracks.

5. The collapsible canopy of claim 1, further comprising: at least one intermediate rib having a leg slidably connected to each of said tracks, and having means for maintaining said rib in a vertical plane, and
    two flexible straps equal in length to said cover, each said strap being fastened to one of the legs of said intermediate rib, at one end to a leg of asid first rib and at the other end to a corresponding leg of said second rib , whereby movement of said first rib away from said second rib will cause said straps to pull said intermediate rib slidably into position between said first and second ribs.

6. The collapsible canopy for pick-up trucks of claim 5, further comprising means for maintaining the longitudinal position of said first rib away from said second rib.

7. The collapsible canopy for pick-up trucks of claim 5, wherein the legs of said second rib are slidably mounted to said tracks and further comprising means for operabley securing said second rib at a position forward of said first rib.

8. The collapsbile canopy for pick-up trucks of claim 5, wherein said tracks have a stop at the forward ends thereof, whereby said first, said intermediate and said second ribs maybe removed from the rearward ends of said tracks.

* * * * *